United States Patent
Kida et al.

(10) Patent No.: US 9,904,620 B2
(45) Date of Patent: Feb. 27, 2018

(54) INFORMATION PROCESSING APPARATUS AND METHOD FOR WRITING DATA TO A STORAGE MEDIUM

(71) Applicant: SONY CORPORATION, Tokyo (JP)

(72) Inventors: Takashi Kida, Tokyo (JP); Kazumi Sato, Kanagawa (JP); Takuma Mabuchi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/584,927

(22) Filed: Dec. 29, 2014

(65) Prior Publication Data

US 2015/0205718 A1   Jul. 23, 2015

(30) Foreign Application Priority Data

Jan. 20, 2014   (JP) ................. 2014-007662

(51) Int. Cl.
*G06F 12/00*   (2006.01)
*G06F 12/02*   (2006.01)

(52) U.S. Cl.
CPC .. *G06F 12/0246* (2013.01); *G06F 2212/7202* (2013.01)

(58) Field of Classification Search
CPC ............... G06F 12/0246; G06F 2212/7202
See application file for complete search history.

(56) References Cited

U.S. PATENT DOCUMENTS

| | | | |
|---|---|---|---|
| 8,966,164 B1* | 2/2015 | Asnaashari | G06F 12/0246 711/103 |
| 2004/0193786 A1* | 9/2004 | Inagaki | G06F 12/0246 711/105 |
| 2006/0184718 A1* | 8/2006 | Sinclair | G06F 3/0608 711/103 |
| 2006/0218347 A1* | 9/2006 | Oshima | G06F 12/0246 711/115 |
| 2007/0088666 A1* | 4/2007 | Saito | G06F 3/0613 |
| 2009/0172333 A1* | 7/2009 | Marcu | G06F 3/0611 711/165 |
| 2011/0167197 A1* | 7/2011 | Leinwander | G06F 12/0246 711/103 |
| 2014/0075105 A1* | 3/2014 | Colgrove | G06F 3/061 711/103 |

FOREIGN PATENT DOCUMENTS

JP   2006-113964 A   4/2006

* cited by examiner

*Primary Examiner* — Kalpit Parikh
(74) *Attorney, Agent, or Firm* — Chip Law Group (57) ABSTRACT

An information processing apparatus includes a controller configured to obtain the number of files to be written to a storage medium whose storage area configured in units of a predetermined block and whose stored data is erased in units of the predetermined block, and to determine a policy for selecting, based on the obtained number of files, the block to which the one or more files are to be written.

9 Claims, 5 Drawing Sheets

INFORMATION PROCESSING APPARATUS AND METHOD FOR WRITING DATA TO A STORAGE MEDIUM

CROSS REFERENCE TO RELATED APPLICATIONS

This application claims the benefit of Japanese Priority Patent Application JP 2014-007662 filed Jan. 20, 2014, the entire contents of which are incorporated herein by reference.

BACKGROUND

The present technology relates to an information processing apparatus that dynamically determines an allocation policy of clusters when data is written to a storage medium, an information processing method, and an information processing program.

SUMMARY

In related art, most of information processing apparatuses such as an embedded apparatus often have a single function. That is, a single apparatus realizes a single function. For example, a digital camera takes a photograph and writes data of the taken photograph to a storage medium. A set top box (STB), a Blu-ray (registered trademark) recorder, or the like writes data to a storage medium for recording a received broadcast program.

Such single-function apparatuses only need to statically use a writing method (allocation policy of clusters) optimized for writing one type of data such as photograph data and recording data to a storage medium.

There is disclosed a technique by which a measurement apparatus continuously arranges measured data items in a file system using a static allocation policy of clusters (see Japanese Patent Application Laid-open No. 2006-113964, for example).

Further, in the related art, although a personal computer (PC), smartphone, or tablet computer executes a plurality of functions unlike the single-function embedded apparatuses, nevertheless the PC, smartphone, or tablet computer statically uses a single cluster allocation policy. For example, a smartphone carries out a plurality of types of writing methods including writing photograph data taken by a camera application, writing received data received by a one-segment application, and the like. Nevertheless, the method of allocating clusters for writing is only one that is statically determined.

As mentioned above, in a PC or the like, one cluster allocation policy is applied to all types of writing methods. Thus, there is room for improvement on it. For example, a performance guarantee value of the write performance is lowered, the lifetime of a storage medium is shortened, or fragmentation of a file system occurs.

Conversely, it can be said that, in the PC, smartphone, or tablet computer, a plurality of types of writing with a plurality of functions are performed tolerating these points.

In view of the above-mentioned circumstances, it is desirable to provide an information processing apparatus capable of appropriately inputting and outputting data into/from a storage medium, an information processing method, and an information processing program. According to an embodiment of the present technology, there is provided an information processing apparatus, including a controller configured to obtain the number of files to be written to a storage medium whose storage area configured in units of a predetermined block and whose stored data is erased in units of the predetermined block, and to determine a policy for selecting, based on the obtained number of files, the block to which the one or more files are to be written.

In the information processing apparatus according to the embodiment of the present technology, the controller may be configured to select, if one file is to be written, one block and write the file from a head of the selected block, as the policy.

In the information processing apparatus according to the embodiment of the present technology, the controller may be configured to consider the file written from the head of the selected block as a first file and to write, when a second file is written continuously to the first file in a predetermined period of time, the second file in the same block continuously to the first file.

In the information processing apparatus according to the embodiment of the present technology, the controller may be configured to select, if a plurality of files are to be written at the same time, a plurality of blocks and write the plurality of files from heads of the plurality of selected blocks as the policy.

In the information processing apparatus according to the embodiment of the present technology, the controller may be configured to determine the plurality of blocks based on size information of each of the plurality of files.

In the information processing apparatus according to the embodiment of the present technology, the controller may be configured to further determine the policy based on a type of data included in the written file.

In the information processing apparatus according to the embodiment of the present technology, the controller may be configured to further determine the policy based on the number of write requests from an application program for requesting writing.

According to another embodiment of the present technology, there is provided an information processing method including: obtaining, by a controller, the number of files to be written to a storage medium whose storage area configured in units of a predetermined block and whose stored data is erased in units of the predetermined block; and determining a policy for selecting, based on the obtained number of files, the block to which the one or more files are to be written.

According to still another embodiment of the present technology, there is provided an information processing program that causes a computer to function as a controller configured to obtain the number of files to be written to a storage medium whose storage area configured in units of a predetermined block and whose stored data is erased in units of the predetermined block, and to determine a policy for selecting, based on the obtained number of files, the block to which the one or more files are to be written.

As described above, according to embodiments of the present technology, it is possible to appropriately input and output data into/from a storage medium. It should be noted that the effects described here are not necessarily limited and any effect described in the present disclosure may be provided.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present technology will be described with reference to the drawings. Note that the following descriptions will be made in the order of a focal point of the present technology, differences from generally-used techniques, and a configuration and a processing flow of an information processing apparatus according to the embodiment of the present technology. Finally, processing flows will be described using specific examples.

[Focal Point and Outline]

First, the focal point and outline of the present technology will be described. In the present technology, a Not AND (NAND) type flash memory out of recording media, in which, for writing data, a writing portion has to be first initialized in units of an erase block (units of block) before data is written, is considered. That is, it is a storage medium whose storage area is configured in units of a predetermined block and whose stored data is to be erased in units of such a block.

The focal point is a point that, the write speed of the NAND type flash memory is increased by aligning a head position of an erase block with a write start position for writing data.

In the case where data is written to the storage medium using a file system, the file system manages a writing area in units of a cluster. In view of this, in the present technology, for aligning the head position of the erase block with the write start position for writing data in the NAND type flash memory, a first cluster for writing a file is disposed at the head position of the erase block.

Further, in the present technology, in order to optimize the data input/output performance of a PC, smartphone, or tablet computer that executes a plurality of types of data writing methods, the allocation policy of clusters is optimized for each of functions executed in such an apparatus.

In the present technology, as the allocation policy optimized for each function, two types of allocation policies are assumed. One of the allocation policies is used in the case where a plurality of files are continuously written in a predetermined period of time. In this case, in the present technology, if the NAND type flash memory is used as the storage medium, clusters for the plurality of files are secured in one erase block as continuous areas. Note that this allocation policy will be hereinafter referred to as a sequential allocation policy because the write pattern is sequential.

The plurality of files are continuously written in the one erase block and thus the number of times of initialization processing of erase blocks before writing can be reduced and the write speed can be increased.

The other of the allocation policies is used in the case where a plurality of files are written at the same time (in parallel). In this case, in the present technology, if the NAND type flash memory is used as the storage medium, clusters corresponding to the files to be written at the same time are secured from the heads of a plurality of erase blocks. Note that this allocation policy will be hereinafter referred to as a parallel allocation policy because the write pattern is parallel.

Focusing on one of the files written according to this policy, the file is written in continuous areas from the head in one erase block, and hence the read speed can be increased. For example, even if one of the files written at the same time is erased, the occurrence of fragmentation can be suppressed because the file is written in the continuous areas.

Hereinabove, the focal point and outline of the present technology have been described.

[Differences from Generally-Used Techniques]

Now, differences of the present technology from generally-used techniques will be described.

For example, if data to be written to an optical disc is audio visual (AV) data, there is a technique of detecting whether or not an area to which the data is to be written includes a defective sector in advance. This technique is different from the present technology in that, although this technique dynamically changes a file write algorithm, this algorithm does not relate to the allocation policy of clusters.

Further, a fallocate system call of Linux (registered trademark) uses a technique of dynamically changing a method of securing areas in order to secure continuous areas as file writing areas.

However, unlike the above-mentioned sequential allocation policy, it is not possible to write a plurality of files in continuous areas from the heads of erase blocks in the fallocate system call. Therefore, it is not possible to optimize the write performance when data is written to the NAND type flash memory.

In addition, a tunefs utility of Berkeley software distribution (BSD)-based Unix (registered trademark) is a technique of statically changing an allocation policy in a file system at a mounting/unmounting timing of the file system, which is not applied to the file system being operated unlike the present technology.

Hereinabove, the differences between the generally-used techniques and the present technology have been described.

[Hardware Configuration]

Figure 1:
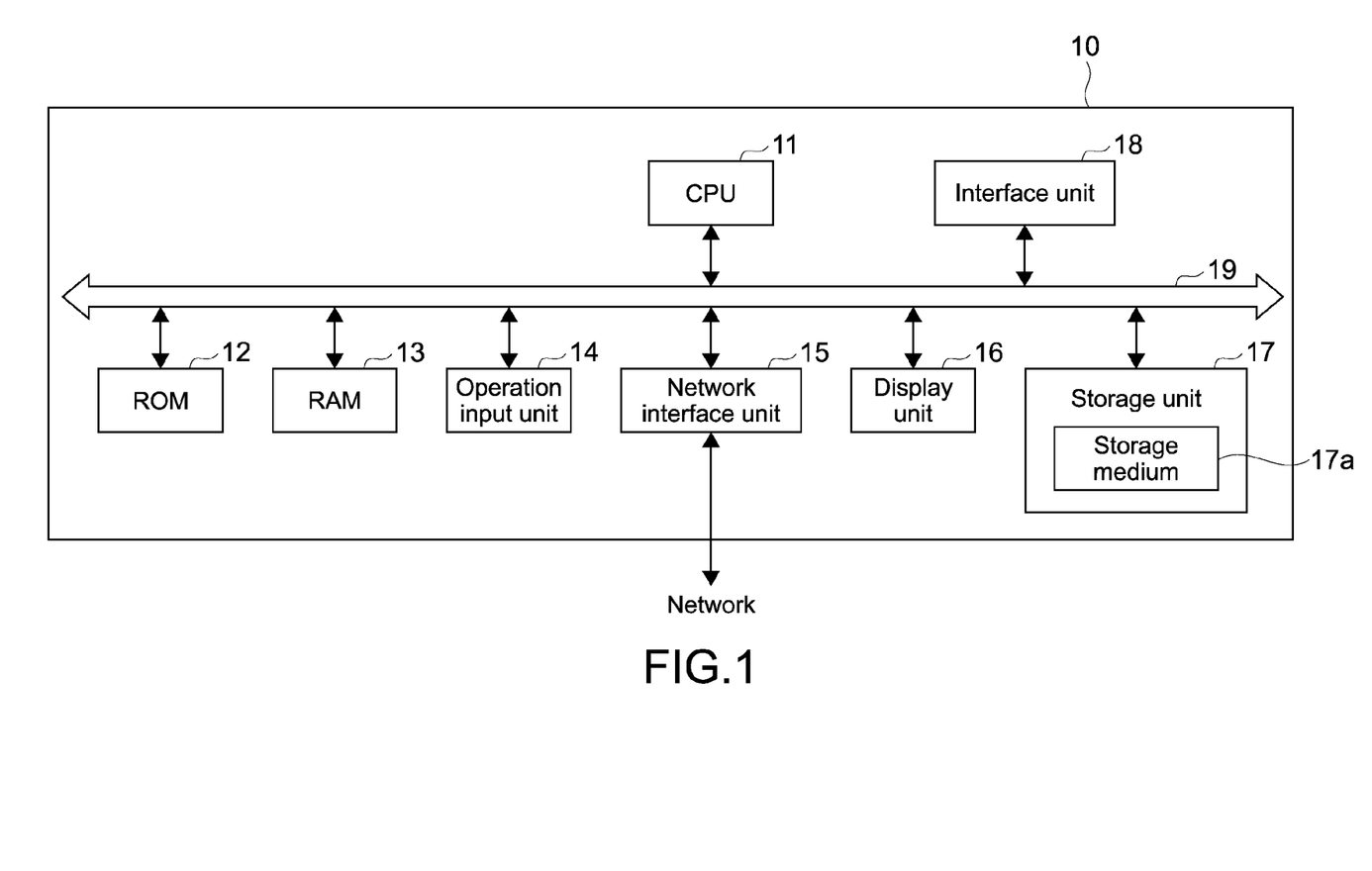
FIG. 1 is a hardware configuration diagram of an information processing apparatus 10 according to an embodiment of the present technology.

Next, a hardware configuration of an information processing apparatus according to an embodiment of the present technology will be described. FIG. 1 is a hardware configuration diagram of an information processing apparatus 10 according to this embodiment.

As shown in the figure, the information processing apparatus 10 includes a central processing unit (CPU)(controller) 11, a read only memory (ROM) 12, a random access memory (RAM) 13, an operation input unit 14, a network interface unit 15, a display unit 16, a storage unit 17, and an interface unit 18. These blocks are connected to one another via a bus 19.

The CPU 11 expands one of a plurality of programs stored in a ROM 12 or the storage unit 17, which corresponds to an instruction from the operation input unit 14, in the RAM 13. The CPU 11 realizes functional blocks to be described later according to the expanded program and appropriately controls the display unit 16, the storage unit 17, and the like.

The ROM 12 fixedly stores a plurality of programs and data such as firmware for executing various types of processing.

The RAM 13 is used as a work area of the CPU 11 and temporarily retains an operating system (OS), various applications being executed, and various types of data being processed.

The operation input unit 14 is, for example, a pointing device such as a mouse, a keyboard, a touch panel, or another operation apparatus.

The network interface unit 15 is connected to a network for receiving and sending information from/to an external system and receives and sends information from/to the external system. Note that the network is not limited to a wired network and may be a wireless network.

The display unit 16 is, for example, a crystal-liquid display, an electro-luminescence (EL) display, a plasma display, or a cathode ray tube (CRT) display. The display unit 16 may be built in the information processing apparatus 10 or may be externally connected thereto.

The storage unit 17 includes a storage medium 17a. The storage medium 17a is, for example, a hard disk drive (HDD), a solid state drive (SSD), a NAND type flash memory such as an embedded multi media card (eMMC), or another non-volatile memory. The storage unit 17 stores an OS, various applications, and various types of data.

The interface unit 18 provides an interface for exchanging data with a storage medium that can be externally connected to the information processing apparatus 10. The externally connectable storage medium may be, as in the storage medium 17a, for example, an HDD, a NAND type flash memory, or another non-volatile memory. Alternatively, a universal serial bus (USB) or the like may be used for connection to the externally connectable storage medium.

Hereinabove, the hardware configuration of the information processing apparatus 10 has been described.

[Software Configuration]

Figure 2:
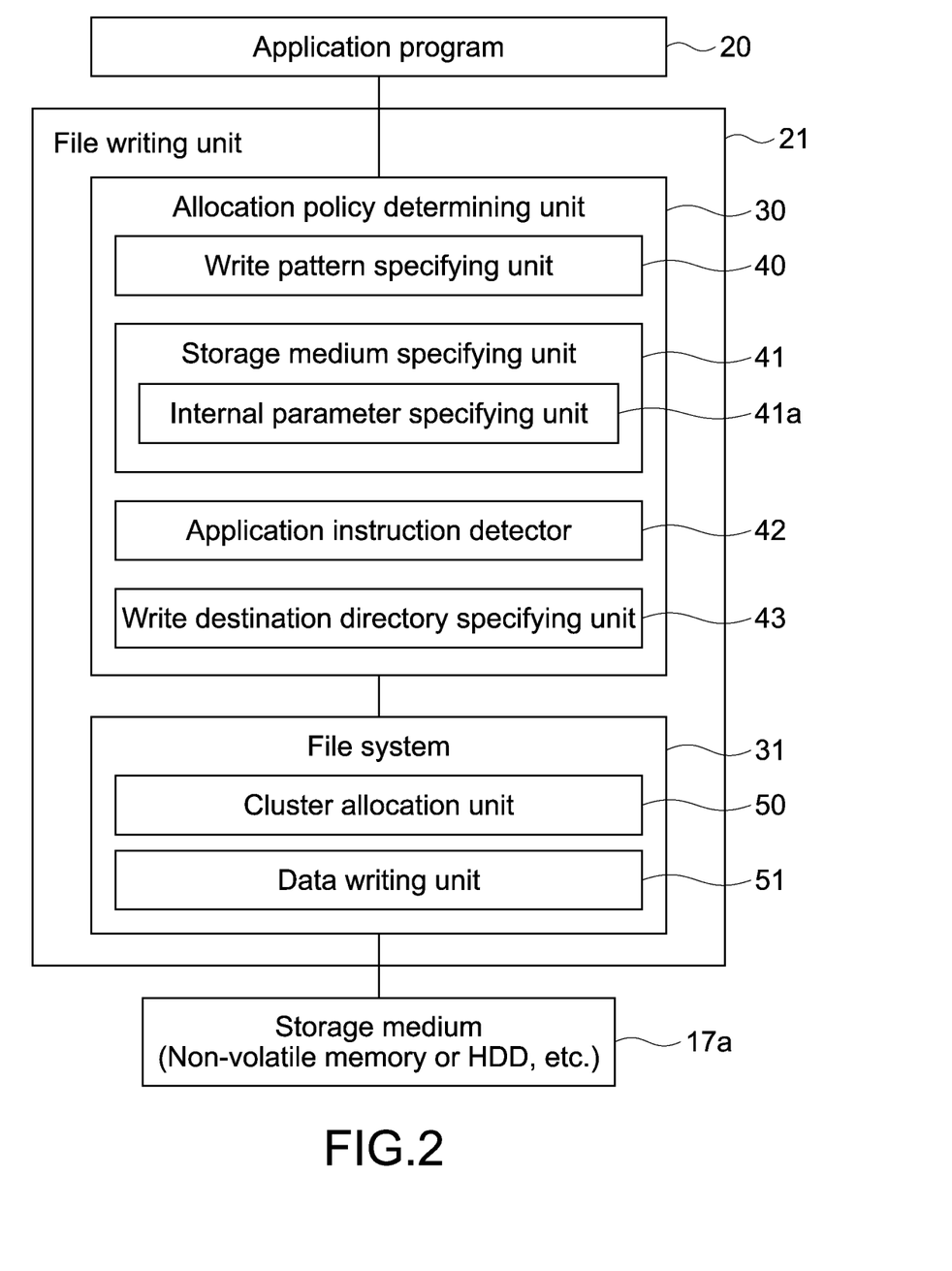
FIG. 2 is a functional block diagram showing a software configuration of the information processing apparatus 10 according to the embodiment.

Next, a software configuration of the information processing apparatus 10 according to this embodiment will be described. FIG. 2 is a functional block diagram showing the software configuration of the information processing apparatus 10 according to this embodiment. Note that only portions of the functional blocks realized by the CPU 11, which are related to the present technology, are shown in the figure.

It is a file writing unit 21 that dynamically changes the allocation policy and writes data as one of the functional blocks of the information processing apparatus 10 according to this embodiment. The file writing unit 21 receives a data write request from an application program 20 such as a camera application program and an internet browser, determines the allocation policy of clusters, and writes data to the storage medium 17a. Note that an externally connected storage medium may also be used as the data write destination.

Broadly, the file writing unit 21 includes the allocation policy determiner 30 and a file system 31. The allocation policy determiner 30 includes a write pattern specifying unit 40, a storage medium specifying unit 41, an application instruction detector 42, and a write destination directory specifying unit 43.

The write pattern specifying unit 40 specifies a write pattern to the storage medium 17a, which is performed by the application program 20. More specifically, the write pattern refers the number of files to be written to the storage medium 17a at the same time, the file size, and the number of write requests to the storage medium 17a from the application program 20. Note that the number of write requests described herein can be in some cases equal to the number of actual writing times or can be in other cases larger than the number of actual writing times.

The storage medium specifying unit 41 specifies the type of the storage medium 17a to which the file is written. Further, the storage medium specifying unit 41 includes an internal parameter specifying unit 41a. The internal parameter specifying unit 41a obtains and specifies a parameter specific to the storage medium 17a, such as the size of the erase block in a non-volatile memory.

The application instruction detector 42 detects whether or not the application program 20 has instructed the file writing unit 21 to use a particular allocation policy. For example, in an OS such as Unix (registered trademark), by using an ioctl system call, the application program 20 can specify a particular allocation policy with respect to the file writing unit 21.

The write destination directory specifying unit 43 specifies a usage purpose of a directory (folder) in which a file is written, which is in a file system constructed in the storage medium 17a. For example, in the case where the storage medium 17a is an SD card and the name of the directory of the write destination is digital camera images (DCIM), the write destination directory specifying unit 43 can specify the data to be written as photograph data. In this manner, the type of data to be written can be considered when the allocation policy is determined.

The allocation policy determiner 30 determines an allocation policy to be actually used based on information obtained by the write pattern specifying unit 40, the storage medium specifying unit 41, the application instruction detector 42, and the write destination directory specifying unit 43. For example, which of the sequential allocation policy and the parallel allocation policy is to be employed is determined based on the number of files to be written to the storage medium 17a at the same time.

Further, for example, a write start position of a file is determined based on the size of the file to be written or the size of the erase block. If a plurality of files are written in parallel, by how much distance D the write start positions of files need to be spaced apart from one another is determined.

In addition, for example, in the case where the application program 20 specifies a particular allocation policy by using the ioctl system call or the like, the allocation policy determiner 30 determines the specified allocation policy as priority.

The file writing unit 21 sets in the file system 31 the allocation policy determined by the allocation policy determiner 30, to thereby perform data writing optimal to the storage medium or the data to be written.

Note that the file system 31 includes a cluster allocation unit 50 and a data write unit 51. When receiving a file write instruction from the application program 20, the cluster allocation unit 50 secures a cluster that is a necessary area based on the determined allocation policy.

The data write unit 51 writes data to the cluster area secured by the cluster allocation unit 50. Hereinabove, the software configuration of the information processing apparatus 10 according to this embodiment has been described.

[Specific Example of Processing of Determining Allocation Policy]

Figure 3:
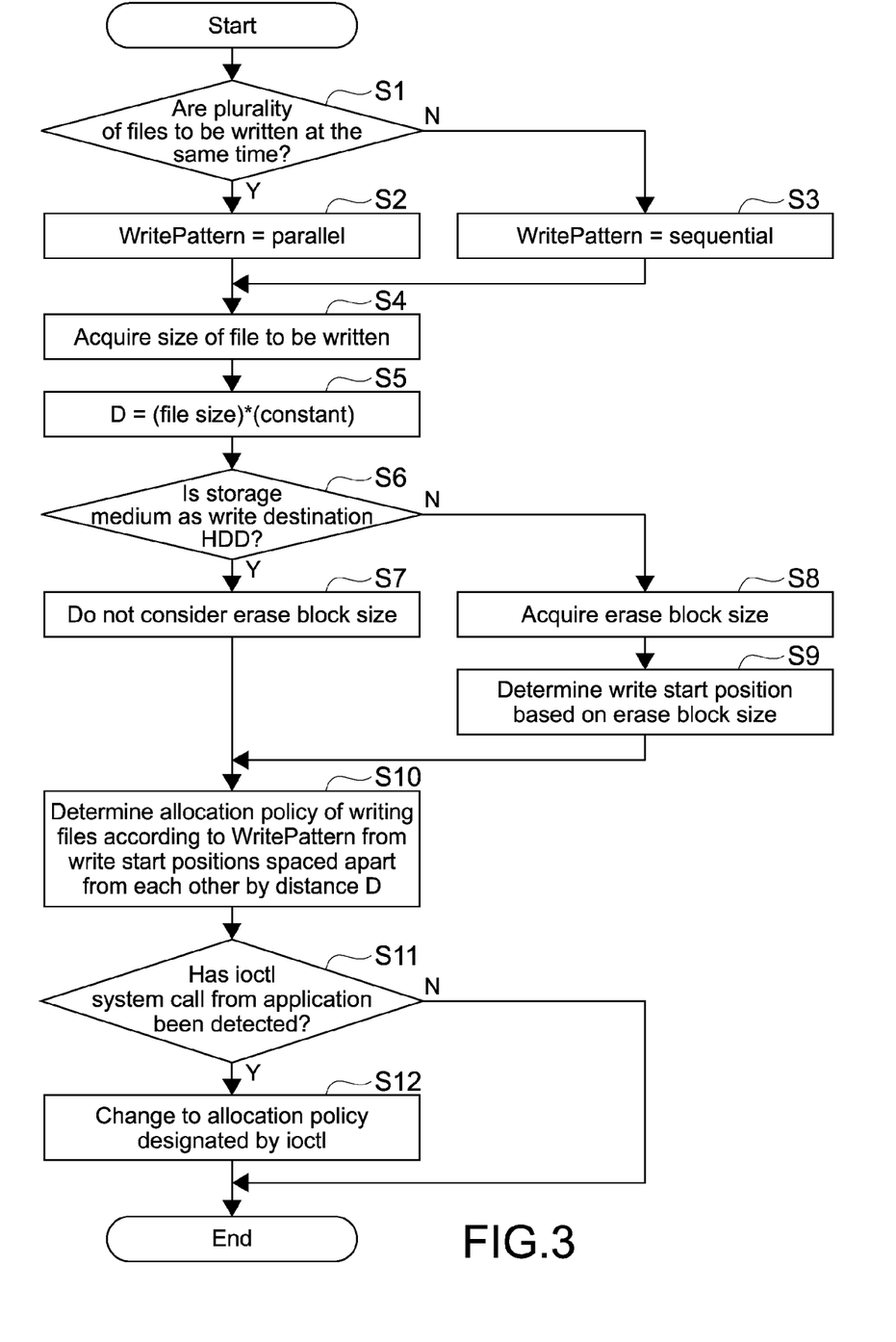
FIG. 3 is a flowchart for explaining a specific example of processing of determining an allocation policy of clusters by an allocation policy determiner 30.

Next, a specific example of processing of determining the allocation policy of clusters by the allocation policy determiner 30 will be described. FIG. 3 is a flowchart for explaining a specific example of processing of determining the allocation policy of clusters by the allocation policy determiner 30.

Note that a procedure of processing shown in this flowchart is merely an example and the procedure of processing of determining the allocation policy by the allocation policy determiner 30 is not limited to this example.

First, the write pattern specifying unit 40 determines whether or not a plurality of files are to be written to the storage medium 17a at the same time (Step S1). If the plurality of files are to be written (Y in Step S1), the write pattern specifying unit 40 sets Parallel as the write pattern (Step S2).

If the plurality of files are not to be written (N in Step S1), the write pattern specifying unit 40 sets Sequential as the write pattern (Step S3). Note that the write pattern set in Step S2 or S3 is referred in Step S10 and used for determining the allocation policy.

Next, the write pattern specifying unit 40 obtains the size of the file to be written to the storage medium 17a (Step S4).

Next, if a plurality of files are to be written at the same time, the write pattern specifying unit 40 calculates the distance D by which the write start positions of the plurality of files are spaced apart from one another by multiplying the file size obtained in Step S4 by a constant set in advance (Step S5). Note that the distance D calculated in Step S5 is referred in Step S10 and used for determining the allocation policy.

Next, the storage medium specifying unit 41 judges whether or not the storage medium 17a as the write destination of the file is an HDD (Step S6).

If the write destination is the HDD (Y in Step S6), the HDD does not have the concept of the erase block, and hence the storage medium specifying unit 41 does not consider the erase block size (Step S7).

If the write destination is not the HDD (N in Step S6), the internal parameter specifying unit 41a obtains the size of the erase block of the storage medium 17a (Step S8) and determines, based on the obtained erase block size, the write start position of the file (Step S9). Note that the write start position determined in Step S8 is referred in Step S10 and used for determining the allocation policy.

Next, based on the write pattern, distance D, and write start position determined in the above-mentioned steps, the allocation policy determiner 30 determines the allocation policy of clusters (Step S10).

Next, the application instruction detector 42 judges whether or not an instruction of the allocation policy by the ioctl system call or the like from the application program 20 has been received (Step S11).

If the instruction of the allocation policy from the application program 20 has been received (Y in Step S11), the allocation policy determiner 30 changes the allocation policy determined in Step S10 to the designated allocation policy (Step S12).

Hereinabove, the specific example of processing of determining the allocation policy of clusters by the allocation policy determiner 30 has been described.

[Specific Examples of Two Allocation Policies]

Now, how clusters are allocated in the storage medium based on the above-mentioned two allocation policies will be described using a specific example. Note that, although the description will be made by exemplifying the storage medium 17a incorporated in the information processing apparatus 10, the same is applied in the case of an external storage medium.

Figure 4:
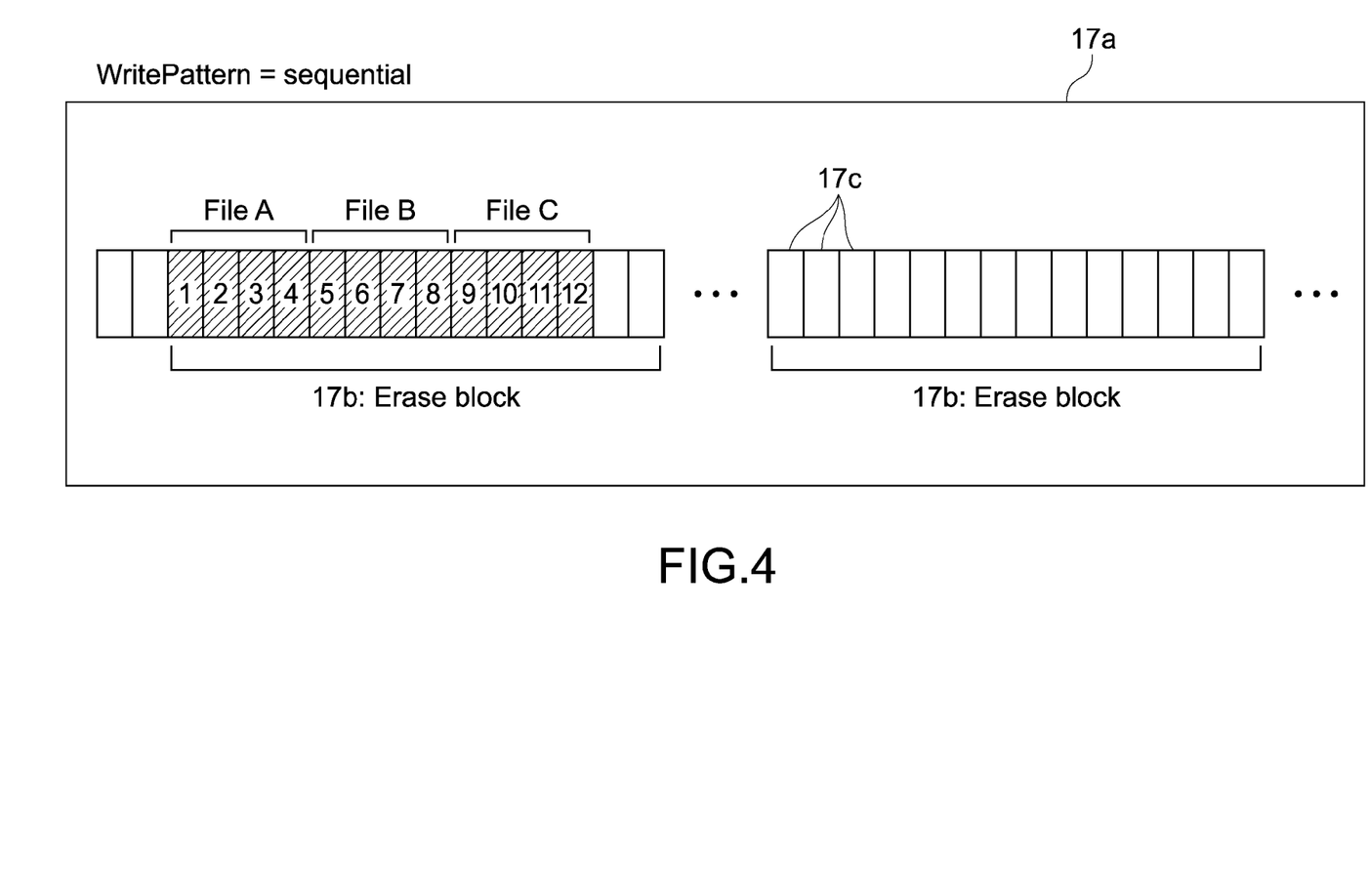
FIG. 4 is a diagram showing how clusters are allocated based on a sequential allocation policy.

First, how the clusters are allocated based on the sequential allocation policy will be described. FIG. 4 is a view showing how the clusters are allocated based on the sequential allocation policy.

The storage medium 17a is partitioned for each of erase blocks 17b having a predetermined size. Then, the erase blocks 17b are partitioned into the clusters 17c having a predetermined size. The numerals written to the clusters 17c in the figure show the order of allocating the clusters 17c.

According to the sequential allocation policy, the clusters 17c are allocated such that three files of a file A (first file), a file B (second file), and a file C are sequentially written from the head of one of the erase blocks 17b.

In the sequential allocation policy, the plurality of files are written in the same erase block 17b, and hence the write speed can be maximized.

Figure 5:
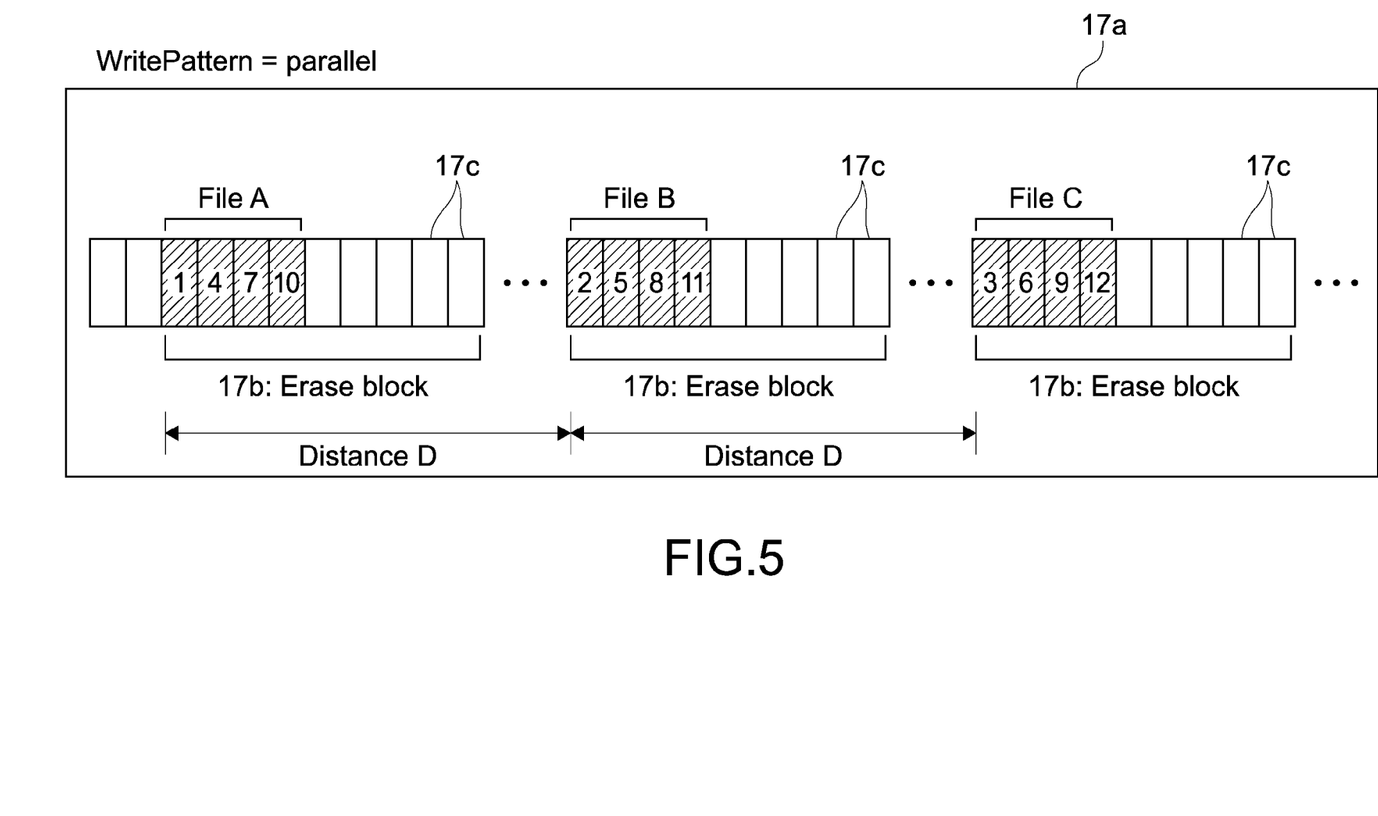
FIG. 5 is a diagram showing how clusters are allocated based on a parallel allocation policy.

Next, how the clusters are allocated based on the parallel allocation policy will be described. FIG. 5 is a view showing how the clusters are allocated based on the parallel allocation policy.

The relationship between the erase blocks 17b and the clusters 17c in the storage medium 17a is the same as that shown in the description of the sequential allocation policy. In the case of the parallel allocation policy, the clusters are allocated such that the three files A, B, and C are written at the same time from the heads of the plurality of erase blocks 17b spaced apart from one another by the distance D. Regarding each file, the continuous clusters are allocated as an area in which the file is to be recorded.

In the case of the parallel allocation policy, whether or not the write speed can be maximized depends on the properties of the storage medium 17a. However, in regards to the data read speed, data of one file is written to the continuous clusters, and hence the speed can be maximized.

Herein above, how the clusters are allocated according to the two allocation policies in the storage medium has been described above using the specific examples.

[First Specific Example of Dynamic Change of Allocation Policy]

Next, a first specific example of a dynamic change of the allocation policy will be described. Note that assumed is a situation where a plurality of files are downloaded by a web browser (hereinafter, referred to as browser application) after continuous photographing is performed by a camera application program 20 (hereinafter, referred to as camera application) in the information processing apparatus 10 that is a smartphone. It is also assumed that a NAND type flash memory incorporated in the smartphone is used as the storage medium in which the files are to be written.

(1-A) First, when the camera application is started, the write pattern specifying unit 40 specifies the write pattern of the camera application as being a pattern of writing files having a relatively small size one by one.

(1-B) At the same time, the storage medium specifying unit 41 specifies the storage medium 17a as a write destination of data as being the NAND type flash memory, and the internal parameter specifying unit 41a obtains an erase block size of the storage medium 17a.

(2) Next, the allocation policy determiner 30 employs the sequential allocation policy as the allocation policy based on the specified write pattern and the erase block size.

(3) When the sequential allocation policy is employed and then the user performs continuous photographing by using the camera application, the file writing unit 21 allocates clusters according to the sequential allocation policy and writes the photograph data.

(4) When the camera application detects that a predetermined period of time has been elapsed after the end of continuous photographing, the camera application issues an ioctl system call, to thereby instruct to set the write start position of the file to the head of a new erase block 17b for next continuous photographing.

(5) When the application instruction detector 42 detects the ioctl system call issued by the camera application, the file writing unit 21 re-adjusts the write start position of the file to the head of the new erase block 17b. In this manner, processing of writing data by the camera application based on the sequential allocation policy is performed.

(6) Next, it is assumed that the user changes the application program 20 to be used from the camera application to the web browser and tries to download a plurality of moving data pieces at the same time from a site over a network by using the web browser.

(7-A) When the web browser downloads the plurality of files at the same time, the write pattern specifying unit 40 specifies the write pattern to the storage medium 17a when the moving data pieces are downloaded by the web browser at the same time as being a pattern of writing a plurality of large-volume files at the same time.

(7-B) Further, the storage medium specifying unit 41 specifies the storage medium 17a as a write destination of the moving data pieces as being the NAND type flash memory as in the camera application.

(8) When the storage medium 17a is specified as being the NAND type flash memory, the internal parameter specifying unit 41a obtains the erase block size of the storage medium 17a.

(9) Next, the allocation policy determiner 30 employs the parallel allocation policy as the allocation policy based on the specified write pattern and the obtained erase block size. At this point of time, the allocation policy of clusters is dynamically changed from the sequential allocation policy to the parallel allocation policy.

(10) After that, when the plurality of moving image data pieces are downloaded by the web browser, the file writing unit 21 writes the moving image data pieces to the storage medium 17a based on the parallel allocation policy.

Hereinabove, the first specific example of the dynamic change of the allocation policy has been described.

[Second Specific Example of Dynamic Change of Allocation Policy]

Next, a second specific example of the dynamic change of the allocation policy will be described. The situation assumed here is that, although the user uses the same application program 20, the write pattern to the storage medium 17a by the application program 20 is changed at a certain point of time, and hence the allocation policy is dynamically changed.

As the specific example, a case where the user temporarily pauses continuous photographing by the camera application and performs photographing again is exemplified.

In this example, as described above, when the user starts continuous photographing using the camera application, the file writing unit 21 writes data according to the sequential allocation policy.

Here, the user temporarily stops continuous photographing. The file writing unit 21 detects the temporary stop and resets the allocation policy. At a point of time at which the user starts continuous photographing again after a predetermined period of time, the file writing unit 21 sets the allocation policy to the sequential allocation policy again.

By setting the sequential allocation policy again, the data write start position is positioned at the head of a new erase block and writing is started.

Hereinabove, the second specific example of the dynamic change of the allocation policy has been described.

[Third Specific Example of Allocation Policy Change]

Next, a third specific example of the allocation policy change will be described. Assumed herein is a situation where a write destination of a file is changed from the storage medium 17a incorporated in the information processing apparatus 10 to an external storage medium (vise a versa) or a situation where the storage medium is replaced by a different type of storage medium.

For example, there is a case where a built-in storage medium 17a is changed from an eMMC to an HDD. There is also a case where the built-in storage medium 17a is changed from an eMMC to an SD card, both of which are non-volatile semiconductor memories.

In the case where the storage medium is changed from eMMC to the HDD, it becomes unnecessary to consider the erase block, and hence data is written using a third allocation policy different from the above-mentioned sequential allocation policy and parallel allocation policy.

In the case where the type and volume of the non-volatile semiconductor memory is changed, such as the change from the eMMC to the SD card or the like, an internal parameter such as an erase block size is obtained again and the obtained information is reflected to the selection of the allocation policy.

Hereinabove, the third specific example of the allocation policy change has been described.

[Effects]

With the present technology, the allocation policy is dynamically changed depending on the write pattern of the file by the application program or the type of storage medium as the write destination and thus the following effects can be exerted:

(1) Increase in file write speed
(2) Increase in read speed of written files
(3) Suppression of fragmentation of file system
(4) Increase in lifetime of storage medium Note that these effects can be exerted at the same time by devising the allocation policy.

[Supplementary Matter]

In addition, the present technology is not limited only to the above-mentioned embodiment and various changes can be made without departing from the gist of the present technology.

[Other Configurations of Present Technology]

It should be noted that the present technology may also take the following configurations:

(1) An information processing apparatus, including a controller configured to obtain the number of files to be written to a storage medium whose storage area configured in units of a predetermined block and whose stored data is erased in units of the predetermined block, and to determine a policy for selecting, based on the obtained number of files, the block to which the one or more files are to be written.

(2) The information processing apparatus according to (1), in which the controller is configured to select, if one file is to be written, one block and write the file from a head of the selected block, as the policy.

(3) The information processing apparatus according to (2), in which the controller is configured to consider the file written from the head of the selected block as a first file and to write, when a second file is written continuously to the first file in a predetermined period of time, the second file in the same block continuously to the first file.

(4) The information processing apparatus according to (1), in which the controller is configured to select, if a plurality of files are to be written at the same time, a plurality of blocks and write the plurality of files from heads of the plurality of selected blocks, as the policy.

(5) The information processing apparatus according to (4), in which the controller is configured to determine the plurality of blocks based on size information of each of the plurality of files.

(6) The information processing apparatus according to any one of (1) to (5), in which the controller is configured to further determine the policy based on a type of data included in the written file.
(7) The information processing apparatus according to any one of (1) to (6), in which the controller is configured to further determine the policy based on the number of write requests from an application program for requesting writing.
(8) An information processing method, including: obtaining, by a controller, the number of files to be written to a storage medium whose storage area configured in units of a predetermined block and whose stored data is erased in units of the predetermined block; and determining a policy for selecting, based on the obtained number of files, the block to which the one or more files are to be written.
(9) An information processing program that causes a computer to function as a controller configured to obtain the number of files to be written to a storage medium whose storage area configured in units of a predetermined block and whose stored data is erased in units of the predetermined block, and to determine a policy for selecting, based on the obtained number of files, the block to which the one or more files are to be written.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
   a memory configured to store instructions; and
   a central processing unit (CPU) configured to execute instructions stored in the memory, wherein the CPU is configured to:
   obtain a count that specifies a number of a plurality of files to be written to a storage medium, wherein the storage medium comprises a plurality of blocks, and wherein each block of the plurality of blocks includes units;
   determine, based on the obtained count, a policy for selection of at least one block, of the plurality of blocks, to which at least one file of the plurality of files is to be written;
   select, based on the plurality of files which are to be concurrently written, the plurality of blocks based on the policy, wherein the policy is further determined based on a reception of a number of write requests that is larger than a number of writing times to write the plurality of files; and
   write each file of the plurality of files from a head of a respective block of the selected plurality of blocks.

2. The information processing apparatus according to claim 1, wherein the CPU is further configured to:
   select, based on the at least one file of the plurality of files that is to be written, the at least one block of the plurality of blocks; and
   write the at least one file from the head of the at least one block of the plurality of blocks.

3. The information processing apparatus according to claim 2, wherein the CPU is further configured to:
   consider the at least one file written from the head of the at least one block as a first file; and write, based on a second file that is written continuously to the first file in a period of time, the second file in the at least one block continuously to the first file.

4. The information processing apparatus according to claim 1, wherein the CPU is further configured to determine the plurality of blocks based on size information of each of the plurality of files.

5. The information processing apparatus according to claim 1, wherein the CPU is further configured to determine the policy based on a type of data written in the plurality of files.

6. The information processing apparatus according to claim 1, wherein the CPU is further configured to concurrently write the plurality of files in from the head of each of the selected plurality of blocks, based on a parallel allocation policy.

7. The information processing apparatus according to claim 1, wherein the CPU is further configured to determine a distance between write start positions of the plurality of files to concurrently write the plurality of files.

8. An information processing method, comprising:
   obtaining, by a controller, count that specifies a number of a plurality of files to be written to a storage medium, wherein the storage medium comprises a plurality of blocks, and wherein each block of the plurality of blocks includes units;
   determining, based on the obtained count, a policy for selecting at least one block, of the plurality of blocks, to which at least one file of the plurality of files is to be written;
   selecting, based on the plurality of files which are to be concurrently written, the plurality of blocks based on the policy, wherein the policy is further determined based on a reception of a number of write requests that is larger than a number of writing times to write the plurality of files; and
   writing each file of the plurality of files from a head of a respective block of the selected plurality of blocks.

9. A non-transitory computer-readable storage medium having stored thereon, computer-executable instructions, which when executed by a computer, cause the computer to execute operations, the operations comprising:
   obtaining a count that specifies a number of a plurality of files to be written to a storage medium, wherein the storage medium comprises a plurality of blocks, and wherein each block of the plurality of blocks includes units;
   determining, based on the obtained count, a policy for selecting at least one block, of the plurality of blocks, to which at least one file of the plurality of files is to be written;
   selecting, based on the plurality of files which are to be concurrently written, the plurality of blocks based on the policy, wherein the policy is further determined based on a reception of a number of write requests that is larger than a number of writing times to write the plurality of files; and
   writing each file of the plurality of files from a head of a respective block of the selected plurality of blocks.

* * * * *